United States Patent [19]

Wölk et al.

[11] Patent Number: 4,802,808
[45] Date of Patent: Feb. 7, 1989

[54] STACKING APPARATUS FOR DEEP-DRAWN ARTICLES OF PLASTICS OF PLASTICS MATERIAL

[75] Inventors: Frank-Michael Wölk; Horst Zabel, both of Lübeck, Fed. Rep. of Germany

[73] Assignee: Maschinenbau Gabler GmbH, Lübeck, Fed. Rep. of Germany

[21] Appl. No.: 78,919

[22] Filed: Jul. 28, 1987

[30] Foreign Application Priority Data

Jul. 30, 1986 [DE] Fed. Rep. of Germany ....... 3625841

[51] Int. Cl.⁴ ....................... B65G 57/28; B65G 57/30
[52] U.S. Cl. .................................. 414/789.2; 53/541; 53/542; 414/788.2; 414/790.3; 414/795.3; 414/798.4
[58] Field of Search ....................... 414/30, 38, 43, 46, 414/96, 105, 114; 53/142, 541, 542

[56] References Cited

U.S. PATENT DOCUMENTS

| 2,941,339 | 6/1960 | Salwasser | 53/447 |
| 2,985,323 | 5/1961 | Wilson et al. | 414/38 |
| 4,374,559 | 2/1983 | Morton | 53/542 X |

FOREIGN PATENT DOCUMENTS

| 213338 | 2/1961 | Austria | 414/96 |
| 1238382 | 4/1967 | Fed. Rep. of Germany | 414/114 |
| 1779568 | 5/1974 | Fed. Rep. of Germany | |
| 2648563 | 5/1978 | Fed. Rep. of Germany | 414/96 |
| 58-109324 | 6/1983 | Japan | 414/30 |

Primary Examiner—Leslie J. Paperner
Attorney, Agent, or Firm—Toren, McGeady & Associates

[57] ABSTRACT

A stacking apparatus for deep-drawn articles of plastics material, particularly articles manufactured in a thermoforming machine, includes a lower stacking plate and an upper stacking plate which are adapted to receive formed articles from the forming die of the thermoforming machine. The lower and upper stacking plates are used to form a vertical stack of formed articles. The upper stacking plate, including a stack of formed articles carried by the upper stacking plate, can be raised to a position on the working level of a removal station. The removal station includes a support plate forwardly movable approximately horizontally underneath the raised stack of formed articles, a pushing device arranged above the support plate and movable parallel relative to the support plate, and a tilting frame located adjacent the support plate when the support plate is in the forwardly moved position, wherein the tilting frame is tiltable about a horizontal axis from an upright receiving position into a laterally directed, preferably approximately horizontal, discharge or delivery position.

7 Claims, 7 Drawing Sheets

STACKING APPARATUS FOR DEEP-DRAWN ARTICLES OF PLASTICS OF PLASTICS MATERIAL

BACKGROUND OF THE INVENTION

1. Field of the Invention

The present invention relates to a stacking apparatus for deep-drawn articles of plastics material, particularly articles manufactured in a thermoforming machine. The apparatus includes a lower stacking plate and an upper stacking plate which are adapted to receive formed articles from the forming die of the thermoforming machine. The lower and upper stacking plates are used to form a vertical stack of formed articles. The upper stacking plate, including a stack of formed articles carried by the upper stacking plate, can be raised to a position on the working level of a removal station.

2. Description of the Prior Art

Stacking apparatus of the above-described type are known. In these stacking apparatus, the transfer of stacks of formed articles to the removal station can be carried out without having to interrupt the manufacture of deep-drawn articles of plastics material in the forming die. The reason for this is that the stack of formed articles can be moved into the range of the removal station by means of the upper stacking plate, while the lower stacking plate continues to receive and form a stack of formed articles which are during this period, manufactured by and ejected from the forming die. The thermoforming machines are conventionally equipped with forming dies which manufacture several deep-drawn articles of plastics material in a single work step, i.e., simultaneously, and, therefore, must ensure the formation of a corresponding number of stacks of formed articles. These stacks must then be transferred simultaneously and in ordered positions to the removal station.

These known stacking apparatus have the significant disadvantage that the stacks of formed articles received from the removal station are further conveyed in the upright stacking position and can during the transport movement change their relative positions to each other in an undesirable manner, so that an ordered transfer to a removal station, a packing station or a treatment or working station is impaired.

It is, therefore, the primary object of the present invention to provide a stacking apparatus of the above-described type in which it is possible to change the position of the stacks of formed articles received from the removal station and which simultaneously ensures an ordered further transport of these stacks into the range of a subsequent packing station, treatment station or working station.

SUMMARY OF THE INVENTION

In accordance with the present invention, the stacking apparatus of the type described above includes a removal station which is formed by a support plate forwardly movable approximately horizontally underneath the raised stack of formed articles, a pushing device arranged above the support plate and movable parallel relative to the support plate, and a tilting frame located adjacent the support plate when the support plate is in the forwardly moved position, wherein the tilting frame is tiltable about a horizontal axis from an upright receiving position into a laterally directed, preferably approximately horizontal, discharge or delivery position.

Thus, in accordance with the present invention, all stacks of formed articles formed in vertical direction above the forming die of the thermoforming machine are moved together and simultaneously into a relatively stable, horizontal transport position before they reach the range of a subsequent packing station, treatment station or working station.

In accordance with another important further development of the invention, the tilting frame includes a pushing device which can be moved laterally into the tilting device when the tilting device is in the discharge position. The pushing device makes it possible to remove the stacks of formed articles which lie in the tilting device extending horizontally by pushing the stacks either individually or successively in rows in a direction extending transversely of the longitudinal direction of the stacks. Subsequently, the tilting device is returned into its upright initial position.

In accordance with another feature of the present invention, the support plate and the tilting frame of the removal station are capable of simultaneously receiving a large number of stacks of formed articles arranged in several rows. In this case, the pushing device of the tilting frame is constructed so as to act only on a single row of stacks of formed articles. As a result, the operation of the stacking apparatus is optimized.

In accordance with another advantageous feature of the present invention, the pushing device of the tilting frame can be moved in a stepwise manner in accordance with the width of an individual stack of formed articles. This makes it possible to transfer the stacks of formed articles in the tilting frame individually and successively to subsequently arranged packing stations, treatment stations and working stations.

In another advantageous embodiment of the stacking device according to the present invention, the rows of stacks are aligned between two support walls in the region of the pushing device of the tilting frame. One of the support walls has immediately above the support plane an opening for the pushing device. The other support wall has a swingable flap in its lower region.

In the retracted or inoperative position of the pushing device, the flap, due to its own weight or by a spring acting on the flap, assumes a vertically hanging position and, thus, prevents stacks of formed articles from being released from the area defined by the support walls. However, when the pushing device is moved forwardly, the pushing device moves the row of stacks on the level of the pushing device and, thus, the flap is moved against the force of its own weight or of a spring, so that a passage is provided for discharging the stacks of formed articles.

In order to prevent an unintentional separation of the articles of the stacks during the movement of the tilting frame, the present invention further provides that an alignment stop member is arranged in the tilting frame, the stop member being adjustable relative to the height of the stack of formed articles. Prior to the tilting movement of the tilting frame, the stop member is moved against the upper ends of the stacks and, thus, ensures that the articles of the stacks are not separated from each other in axial direction. However, the stop member does not have to be in contact with the upper ends of the stacks of formed articles. Rather, the stop member may be fixed at a slight distance from the upper ends of the stacks, so that the stacks can be more easily pushed out of the tilting frame.

Finally, the present invention further provides that the tilting frame may be movable by means of a tension medium drive, for example, a rope drive. Such a drive not only requires relatively little space, but can also be adapted without problems to different drive requirements.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DETAILED DESCRIPTION OF THE INVENTION

Figure 1:
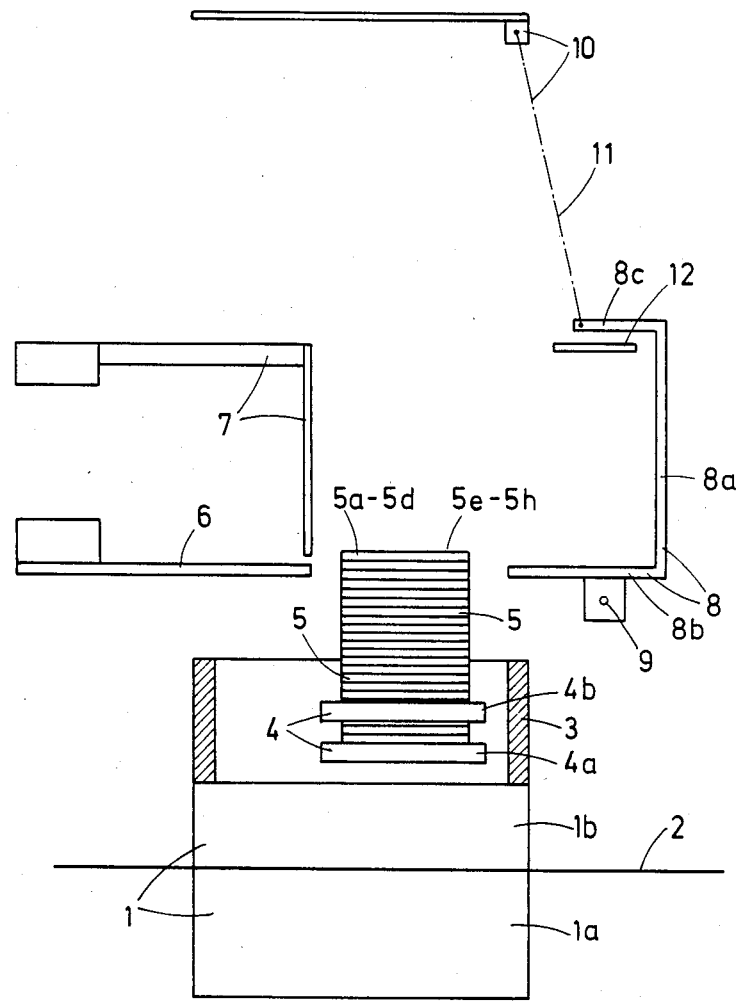
FIGS. 1 to 6 are schematically simplified side views of the stacking apparatus according to the present invention, showing the apparatus in different positions of operation.

In FIGS. 1 through 6 of the drawing, a forming die 1 is illustrated. The forming die 1 forms part of a thermoforming machine for the manufacture of deep-drawn articles of plastics material. The forming die 1 includes a lower die 1a and an upper die 1b. A plastic foil 2 is passed through between the lower and upper dies 1a and 1b.

The thermoforming machine has above the upper die 1b a so-called upper yoke 3 in which there is arranged a lower stacking plate 4a of a stationary stacking device 4 which operates in vertical direction. The stacking device 4 additionally has a second stacking plate 4b which is arranged in the upper yoke 3 so as to be raisable and lowerable over a predetermined range relative to the stacking plate 4a. The stacking device 4 combines the articles which have been manufactured in the forming die 1 of the thermoforming machine and have subsequently been ejected through the upper die 1b into vertically extending stacks of articles 5a through 5d and 5e through 5h. Each individual stack 5a to 5d and 5e to 5h is composed of a plurality of deep-drawn articles 5 of plastics material, as illustrated in FIGS. 1 through 6 of the drawing.

The number of stacks 5a to 5d and 5e to 5h formed in the stacking device depends upon the number of deep-drawn articles 5 of plastics material which are manufactured in a single work step, i.e., simultaneously, in the forming die 1 of the thermoforming machine. In the embodiment illustrated in the drawing, eight articles are manufactured in the forming die 1 in a single work step and, thus, eight stacks 5a to 5d and 5e to 5h are formed.

When the stacks 5a to 5d and 5e to 5h have reached a certain stacking height, i.e., these stacks contain a predetermined number of individual articles 5, the upper stacking plate 4b of the stacking device 4 is raised relative to the lower stacking plate 4a, so that the stacks 5a to 5d and 5e to 5h carried by the upper stacking plate 4b are moved in vertical direction out of the range of the lower stacking plate 4a. The upper stacking plate 4b of the stacking device has thus been moved from its base position according to FIG. 1 into the raised position according to FIG. 2 in which the upper stacking plate 4b is located above the operating plane of a support plate 6. This support plate 6 can be moved in horizontal direction from its position of rest shown in FIGS. 1 and 2 into an operating position according to FIG. 3.

Figure 3:
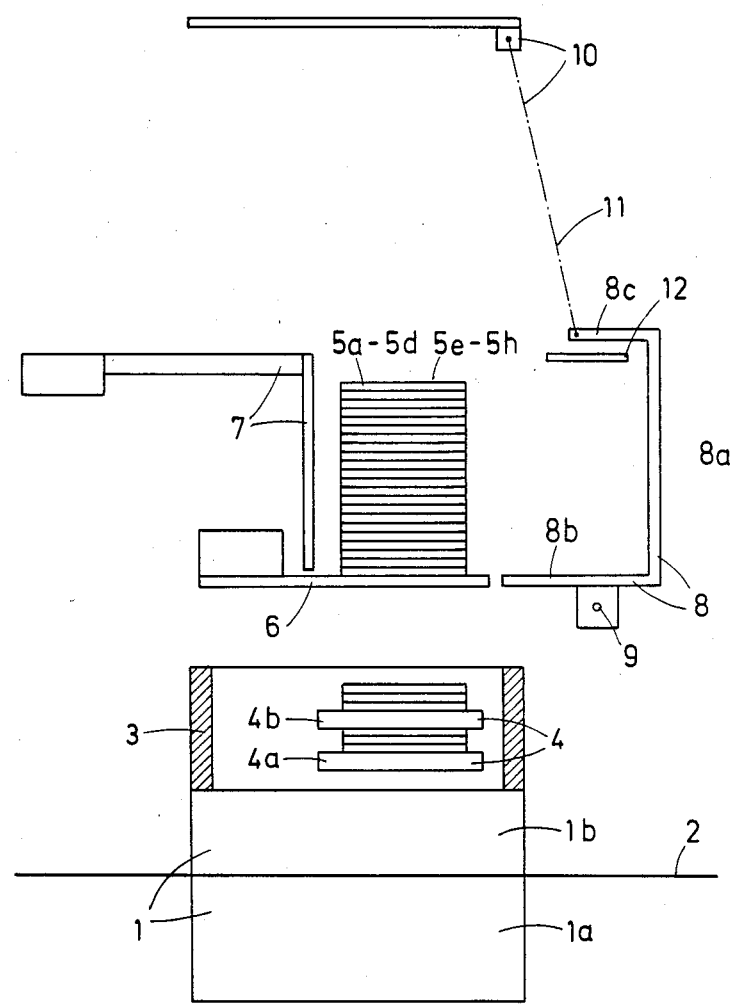

After the stacking plate 6 has been moved under the stacks 5a to 5d and 5e to 5h, as illustrated in FIG. 3, the upper stacking plate 4b of the stacking device 4 can again be returned downwardly into the range of the upper yoke 3 or above the lower stacking plate 4a, as also illustrated in FIG. 3. For this purpose, support plate 6 is constructed in such a way that the lowering movement of the upper stacking plate 4b is possible, while simultaneously lowering of the stacks 5a to 5d and 5e to 5h is prevented by the support plate 6.

During the entire movement cycle of the stacking plate 4b of the stacking device 4, the forming die 1 of the thermoforming machine can continue to manufacture. During this time, the manufactured articles are received by the lower stacking plate 4a. When the upper stacking plate 4b again returns into its initial position, it can take over from the lower stacking plate 4a the articles 5 which have been produced in the meantime, a clearly illustrated in FIG. 3.

Figure 2:
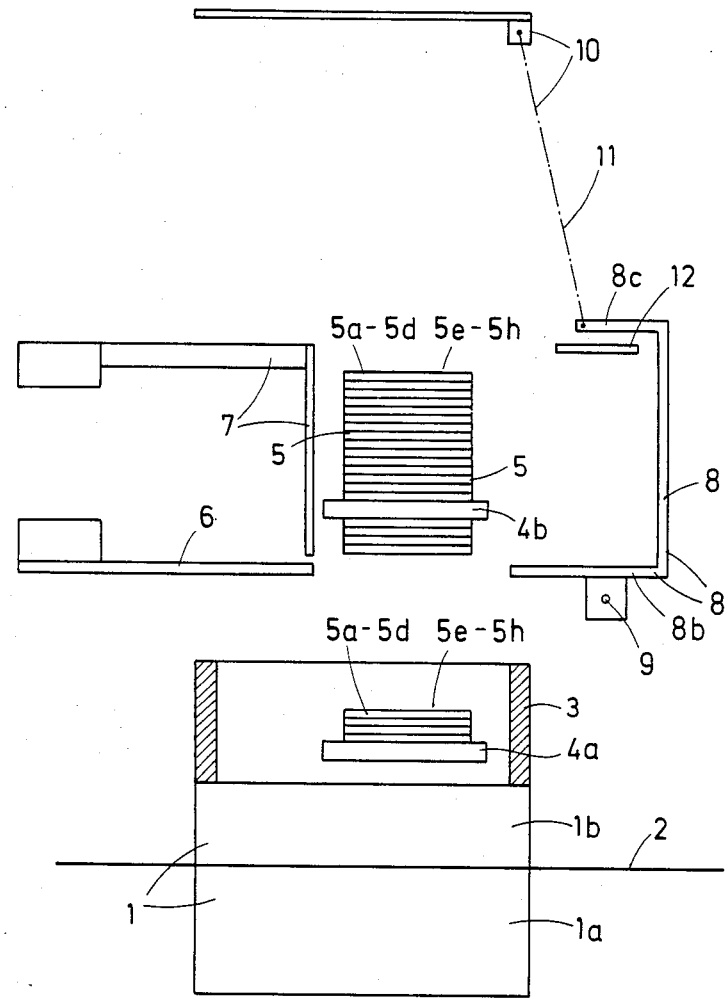
Figure 4:
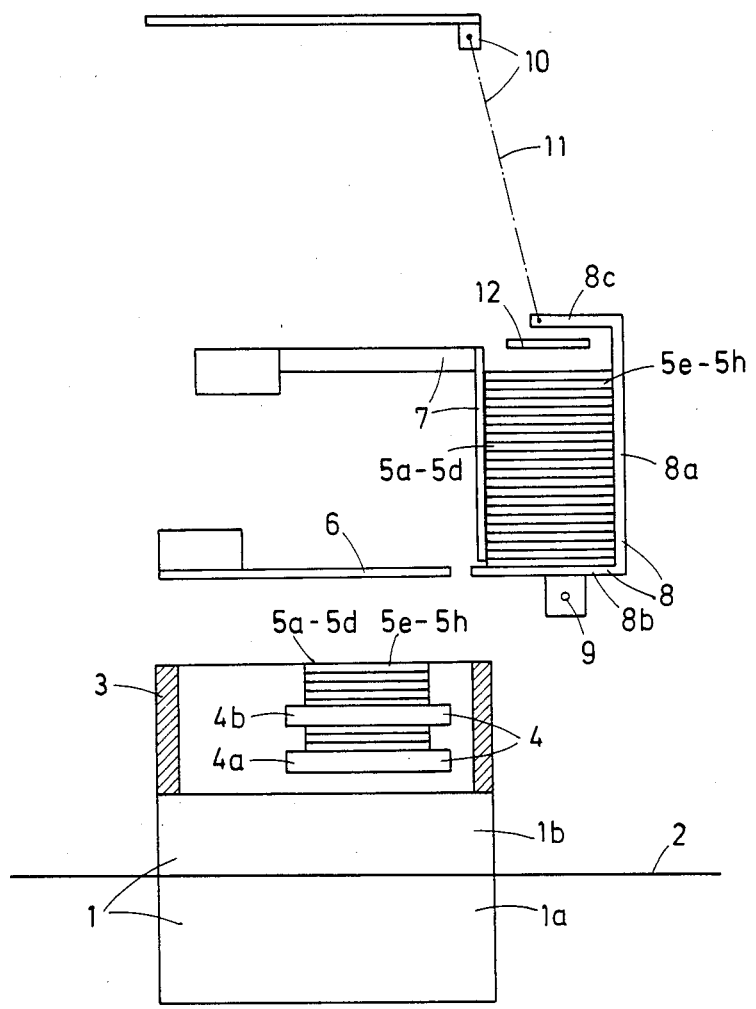

As soon as the upper stacking plate 4b of the stacking device 4 has been lowered underneath the level of the support plate 6, a pushing device 7 arranged above support plate 6 can be moved from its position of rest illustrated in FIGS. 1 to 3 toward the right until it reaches its end position illustrated in FIG. 4. As a result, pushing device 7 pushes the stacks 5a to 5d and 5e to 5h from the support plate 6 onto a tilting frame 8 which is arranged adjacent to the right of support plate 6 when the tilting frame 8 is in its initial position. Tilting frame 8 can be tilted about a horizontal axis 9. Tilting frame 8 has web 8a and two side members 8b and 8c which extend perpendicularly to web 8a. Tilt axis 9 is located adjacent side member 8b which, in the initial position of tilting frame 8, is located on the same plane as and adjacent to support plate 6.

Figure 5:
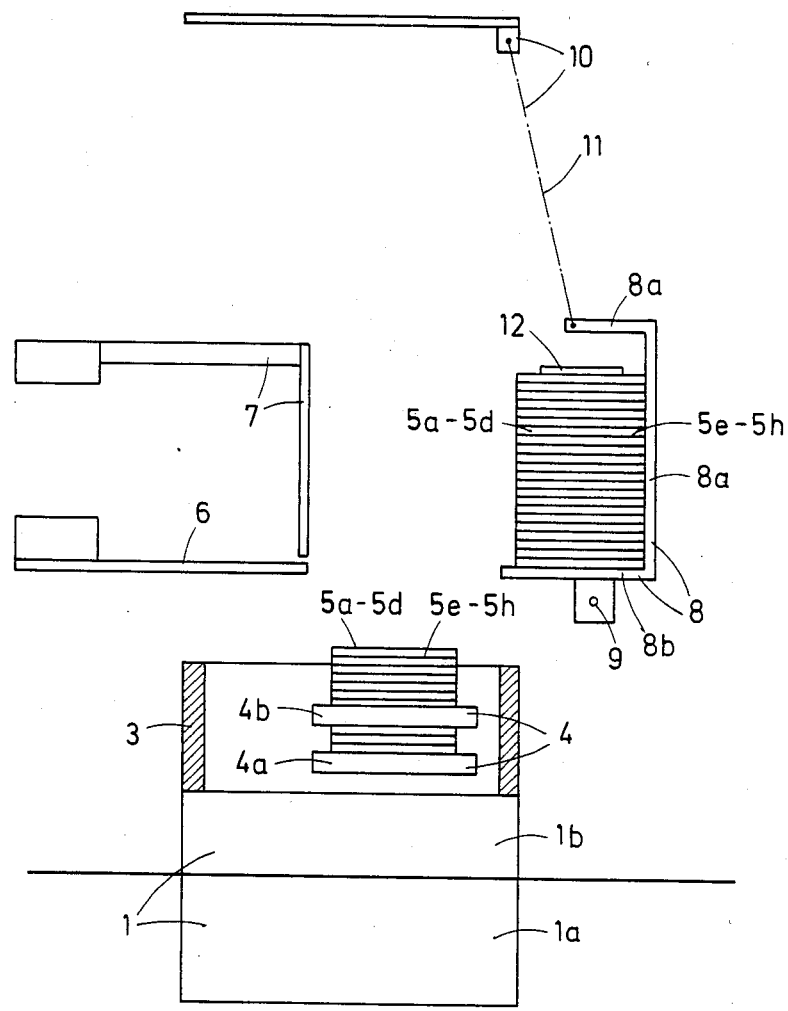

After the stacks of articles have been pushed into the tilting frame 8, as illustrated in FIG. 4, the support plate 6 and the pushing device 7 are returned into their initial positions illustrated in FIGS. 1 and 2. This stage of the operation of the stacking apparatus according to the present invention is illustrated in FIG. 5. Subsequently, the tilting frame 8 can be tilted about its tilt axis 9 from the upright position shown in FIGS. 4 and 5 into an approximately horizontally extending position illustrated in FIG. 6. The tilting frame 8 is advantageously activated by means of a tension medium drive 10 which acts on side member 8c of tilting frame 8, for example, through a rope 11. In the discharge position of the tilting frame 8 illustrated in FIG. 6, the stacks 5a to 5d and 5e to 5h have assumed an approximately horizontal position.

In order to ensure that the stacks 5a to 5d and 5e to 5h maintain their predetermined positions during the tilting movement of the tilting frame 8, an adjustable alignment stop member 12 is provided in the tilting frame 8. Stop member 12 is adjustable to the height of the stacks 5a to 5d and 5e to 5h from side member 8c of tilting frame 8. The adjustment of the stop member 12 may be effected by means of a drive, not shown, which may automatically start to operate as soon as the stacks 5a to 5d and 5e to 5h have been placed in the tilting frame 8, as shown in FIG. 4. However, stop member 12 does not have to be pressing against the upper ends of the stacks 5a to 5d and 5e to 5h, but stop member 12 rather may have a slight distance from the stacks, so that stacks 5a to 5d and 5e to 5h do not become stuck in the tilting frame 8.

Figure 6:
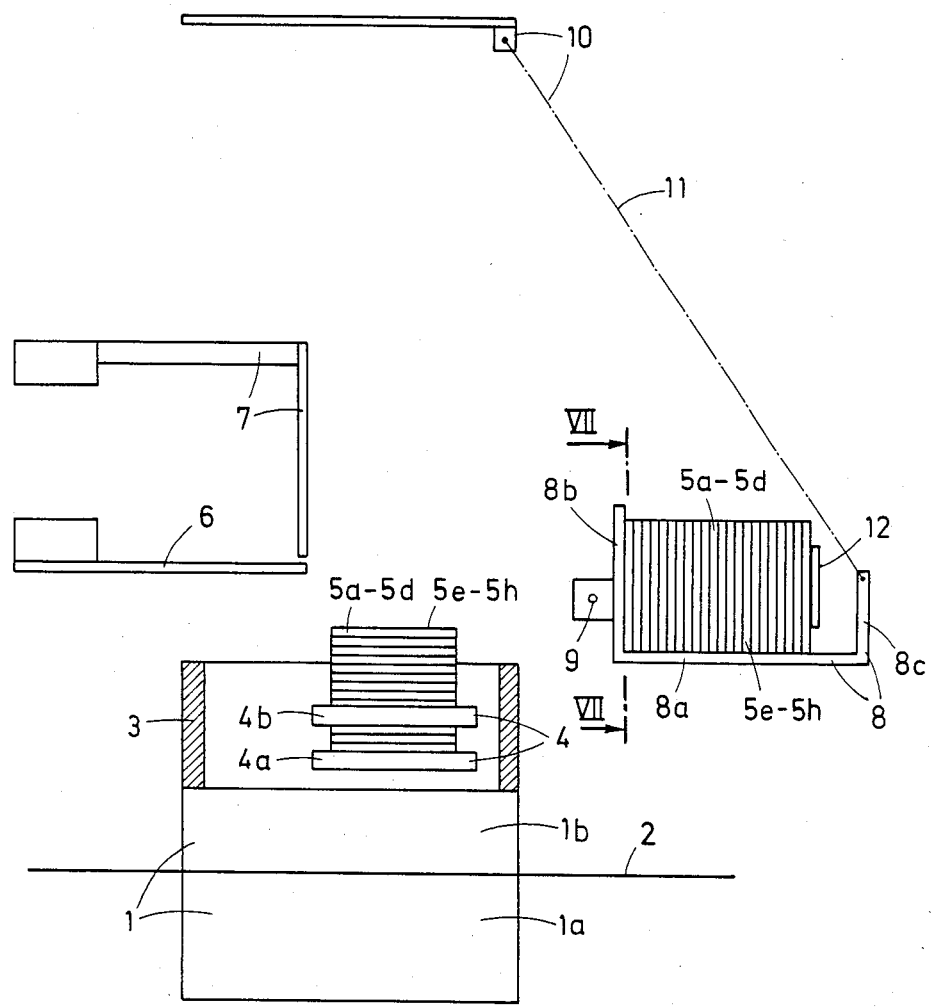
Figure 7:
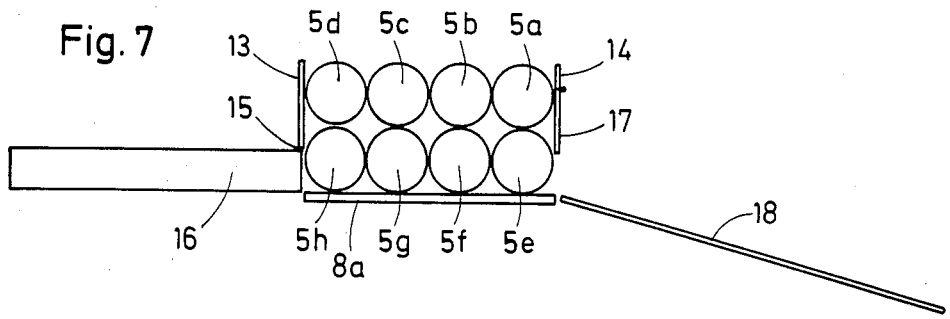
FIGS. 7 to 10 are sectional views taken along the line VII—VII of FIG. 6, showing a detail of the stacking device according to FIGS. 1 to 6 in different positions of operation.

When the tilting frame 8 with the stacks 5a to 5d and 5e to 5h has assumed the discharge position illustrated in FIG. 6, the stacks 5a to 5d and 5e to 5h are placed between two support walls 13 and 14 which extend transversely of the tilt axis 9 and, thus, parallel to the tilting plane of the tilting frame 8. This position of the stacks 5a to 5d and 5e to 5h is shown in FIG. 7 of the drawing. As can be seen from FIG. 7, two rows of stacks located one above the other are formed between the support walls 13 and 14. The upper row of stacks includes the stacks 5a to 5d, while the lower row of stacks includes the stacks 5e to 5h.

Figure 9:
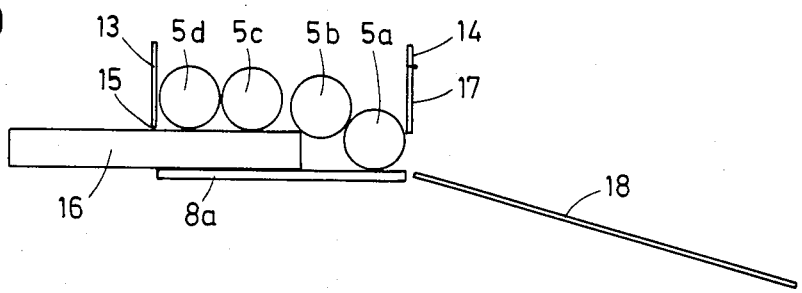

Immediately above the web 8a of the tilting frame 8 in the position illustrated in FIG. 6, support wall 13 has an opening 15 for a pushing device 16, while the opposite support wall 14 is in its lower portion formed by a flap 17 which, for example, due to the force of its own weight, has the tendency to assume a vertical position, as can be seen in FIGS. 7 and 9.

Figure 8:
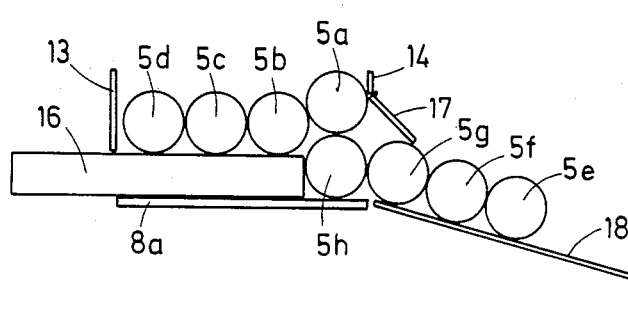
Figure 10:
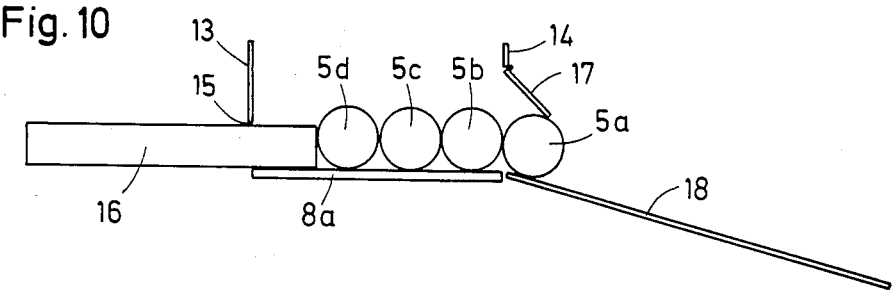

When moved through the opening 15 of support wall 13 above web 8a of tilting frame 8, the pushing device 16 initially acts on the lower row of stacks, as can be seen in FIGS. 7 and 8. The pushing action of the pushing device 16 has the result that the individual stacks 5e to 5h raise flap 17, so that the stacks are successively moved from web 8a of tilting frame 8 onto an inclined discharge board 18, as shown in FIG. 8. When pushing device 16 is returned into its initial position, as seen in FIG. 9, the stacks 5a to 5d of the upper row of stacks are successively lowered onto the web 8a of the tilting frame 8. When the pushing device 16 is again moved into the tilting frame 8, the stacks 5a to 5d are also moved onto the inclined discharge board 18, as can be seen in FIG. 10.

As soon as the pushing device 16 has been returned into its initial position shown in FIG. 7, the empty tilting frame 8 can be returned into its initial position according to FIG. 1 by means of drive 10. Simultaneously, stop member 12 returns into its upper end position at side member 8c of tilting frame 8. The entire stacking device is now again ready for another work cycle, i.e., after the predetermined stacking height has been reached, the stacks 5a to 5d and 5e to 5h received by the upper stacking plate 4b can again be raised by means of the upper stacking plate 4b from the position illustrated in FIG. 1 into the position illustrated in FIG. 2 and, thus, the next work cycle is initiated.

Finally, it should be mentioned that pushing device 16 does not necessarily have to operate with a continuous movement, but rather a stepwise movement is also possible. This stepwise movement of the pushing device 16 can be regulated in such a way that during each movement step, only a single stack of articles is moved from the range of the tilting frame 8 onto the discharge board 18.

While a specific embodiment of the invention has been shown and described in detail to illustrate the application of the inventive principles, it will be understood that the invention may be embodied otherwise without departing from such principles.

We claim:

1. A stacking apparatus for deep-drawn articles made from plastics material in a thermoforming machine, comprising a lower stacking plate and an upper stacking plate adapted for receiving formed articles from a forming die of the thermoforming machine, the lower and upper stacking plates capable of forming vertically extending stacks of articles, the upper stacking plate vertically raisable from a position above the forming die to a raised position, a first pushing dvice for pushing stacks of articles carried by the upper stacking plate into the raised position thereof, a support plate exclusively horizontally movable from a first position into a second position in which the support plate is moved underneath the first pushing device and underneath the stacks of articles carried by the upper stacking plate into the raised position thereof, the support plate capable of carrying the stacks of articles after the upper stacking plate has been lowered, a tilting frame tiltable about a horizontal axis from a vertical position next adjacent the support plate to an essentially horizontal position, the first pushing device being movable horizontally parallel to the support plate, the first pushing device serving for pushing the stacks of articles from the support plate onto the tilting frame when the tilting frame is in the vetical position and a second pushing device capable of sliding into the tilting frame when the tilting frame is in the horizontal position.

2. The stacking apparatus according to claim 1, wherein the support plate and the tilting frame are each capable of receiving a substantial number of stacks of articles arranged in several rows, and wherein the second pushing device is capable of acting on a single row of stacks of articles.

3. The stacking apparatus according to claim 2, wherein the second pushing device is movable into the tilting frame in a stepwise manner, the length of each movement step corresponding to the width of a single stack of articles.

4. The stacking apparatus according to claim 2, comprising two support walls for aligning the rows of stacks of articles when the tilting frame is in the horizontal position, one of the support walls defining an opening for permitting the second pushing device to be moved therethrough, and the other of the support walls including a swingable flap in the lower portion thereof.

5. The stacking apparatus according to claim 1, wherein the tilting frame includes an alignment stop member adjustable to the height of the stacks of articles.

6. The stacking apparatus according to claim 1, comprising a tension medium drive for carrying out the tilting movement of the tilting frame.

7. The stacking apparatus according to claim 6, wherein the tension medium drive is a rope drive.

* * * * *